(12) United States Patent
Yamasaki et al.

(10) Patent No.: US 6,440,516 B1
(45) Date of Patent: *Aug. 27, 2002

(54) OPTICAL DISC

(75) Inventors: Takeshi Yamasaki, Kanagawa; Tomomi Yukumoto, Chiba; Motohiro Furuki; Toshiyuki Kashiwagi, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,913

(22) Filed: Jan. 14, 2000

(30) Foreign Application Priority Data

Jan. 20, 1999 (JP) .............................. 11-012216

(51) Int. Cl.⁷ ................................. B32B 3/02

(52) U.S. Cl. ................. 428/64.1; 428/64.4; 430/270.11

(58) Field of Search .................... 428/64.1, 64.2, 428/64.4, 411.1, 412, 913; 430/270.11, 495.1, 945

(56) References Cited

U.S. PATENT DOCUMENTS 6,242,066 B1 * 6/2001 Yamasaki ............... 428/64.1

* cited by examiner

Primary Examiner—Elizabeth Evans
(74) Attorney, Agent, or Firm—Sonnenschein, Nath & Rosenthal (57) ABSTRACT

An optical disc having a light transmitting layer of a reduced uniform thickness. The optical disc has a transparent film bonded via a pressure-sensitive adhesive sheet or a dry photopolymer sheet on a substrate to serve as a light transmitting layer. The signal recording surface is formed on the substrate and/or the transparent film. The light transmitting layer may be constituted solely by a pressure-sensitive adhesive sheet or a dry photopolymer sheet. In the present optical disc, recording and/or reproduction is performed from the light transmitting layer with respect to the signal recording surface. The pressure-sensitive adhesive sheet or the dry photopolymer sheet is itself in a sheet form and is previously formed into a layer (sheet) of a pre-set thickness, in a manner different from the case in which a UV light curable resin is coated on a substrate. The light transmitting layer of an extremely thin film thickness and devoid of sporadic film thickness variations can easily be formed by using the sheet as an adhesive layer or a light transmitting layer itself.

17 Claims, 11 Drawing Sheets

OPTICAL DISC

RELATED APPLICATION DATA

The present application claims priority to Japanese Application No. P11-012216 filed Jan. 20, 1999, which application is incorporated herein by reference to the extent permitted by law.

BACKGROUND OF THE INVENTION

1. Field of the Invention

This invention relates to an optical disc having a light transmitting layer on a substrate/and adapted for recording and/or reproducing information signals by illuminating laser light from the side of the light transmitting layer.

2. Description of the Related Art

As an optical disc, such a one has so far been widely known in which a replica substrate of light-transmitting plastics, having irregularities on one of its major surfaces, is provided, a reflective film or a recording film is provided on the major surface thereof having the irregularities, a protective film is formed on the signal recording surface and in which the laser light is illuminated from the side of the substrate surface, that is from the side of the substrate opposite to the signal recording surface, to record and/or reproduce information signals.

In such optical disc, it is demanded to reduce the substrate thickness, in order for the substrate to perform the role of a light transmitting layer, if the large capacity exceeding 8 GB is be taken into consideration.

However, the substrate of the optical disc is usually molded by injection molding, such that there is necessarily a limitation in reducing its thickness.

If, in fabricating a substrate 120 mm in diameter, transcription properties of the irregularities are to be secured at an ordinary level (level of a conventional optical disc), the substrate thickness cannot be reduced beyond approximately 300 $\mu$m. On the other hand, if the irregularities are to be transcribed with sufficient accuracy to cope with the increasing capacity, the substrate thickness cannot be reduced beyond approximately 500 $\mu$m.

For this reason, it is extremely difficult to fabricate by injection molding an optical disc substrate, with a thickness of the order of 100 $\mu$m, on which micro-sized irregularities have been transcribed with high accuracy.

This is due to the problem inherent in injection molding, for example, sporadic flowing states in the injection material in a metal mold, that is molten resin, sporadic cooling speed of the metal mold, that is variations in the temperature or viscosity of the molten resin, and so forth.

In view of the above-described status of the art, the present Assignee proposes an optical disc in which a light transmitting layer not larger in thickness than 500 $\mu$m, more specifically, not larger than 177 $\mu$m, is formed on a signal recording surface of the substrate, and in which the laser light is illuminated from the side of the light transmitting layer to record and/or reproduce the information signals.

In this optical disc, the substrate can be of an ordinary thickness, such as, for example, 1.2 mm or 0.6 mm, so that the irregularities can be transcribed with high accuracy by injection molding. On the other hand, the laser light for recording or reproduction is illuminated from the side of the light transmitting layer with a reduced thickness, thus allowing to accommodate high recording capacity.

Meanwhile, if the laser light is illuminated from the light transmitting layer for recording and/or reproduction, the manner of forming the light transmitting layer poses a crucial problem, because fluctuations in the thickness of the light transmitting layer affect the characteristics significantly.

Although it may be contemplated to apply e.g., a UV curable layer by, for example, a spin coating method, for constituting a light transmitting layer, it is difficult in this case to form the light transmitting layer to a uniform film thickness.

SUMMARY OF THE INVENTION

It is therefore an object of the present invention to provide an optical disc having a light transmitting layer of a thin uniform thickness.

In one aspect, the present invention provides an optical disc in which a transparent film is bonded via a pressure-sensitive adhesive sheet or a dry photopolymer sheet on a substrate and in which a signal recording surface is formed on the substrate and/or the transparent film, wherein recording and/or reproduction for the signal recording surface is effected from a light transmitting layer comprised of the pressure-sensitive adhesive sheet or the dry photopolymer sheet and the transparent film.

In another aspect, the present invention provides an optical disc in which at least one major surface of a substrate is a signal recording surface and in which a pressure-sensitive adhesive sheet or a dry photopolymer sheet is bonded as a light transmitting layer on the signal recording surface, wherein recording and/or reproduction is performed from the light transmitting layer with respect to the signal recording surface.

According to the present invention, there may be provided an optical disc which has a reduced uniform thickness to permit higher density recording than is possible with the conventional system.

If, in particular, pressure-sensitive adhesive sheet is used as an adhesive layer, the optical disc may have a high light transmission factor over a wide wavelength range. This is particularly meritorious if high density recording by short wavelength recording is to be achieved.

DESCRIPTION OF THE PREFERRED EMBODIMENTS

Referring to the drawings, preferred embodiments of an optical disc according to the present invention will be explained in detail.

Figure 1:
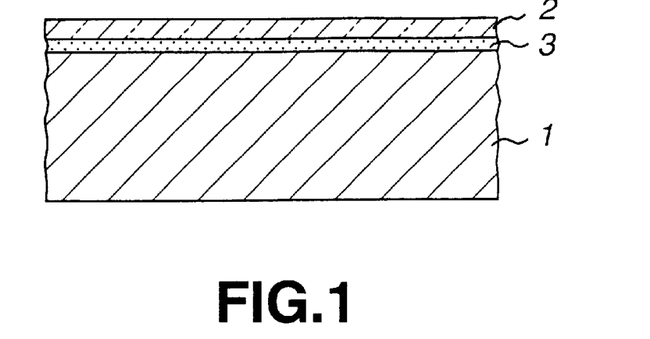
FIG. 1 is a schematic cross-sectional view showing a basic structure of an optical disc embodying the present invention.

The basic structure of the optical disc according to the present invention includes a transparent film 2 bonded via an adhesive layer 3 on one of the major surfaces of a substrate, having a thickness of the order of 1.2 mm or 0.6 mm, as shown in FIG. 1.

In one or both of the bonding surfaces of the substrate 1 and/or the transparent film 2 are formed a pattern of irregularities, such as pits or grooves, to serve as a signal recording surface.

Figure 2:
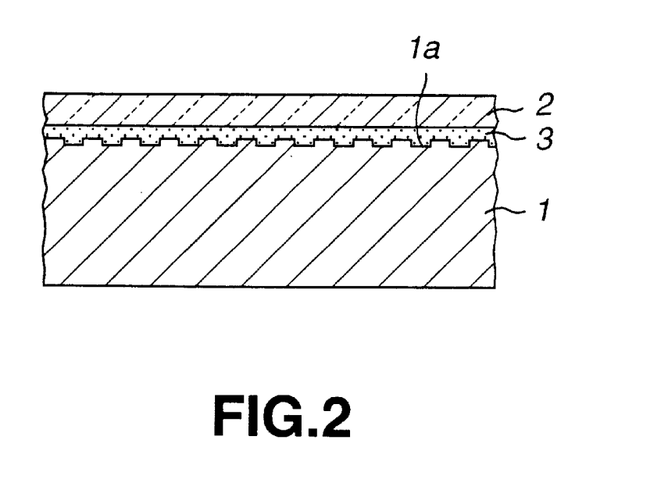
FIG. 2 is a schematic cross-sectional view showing an exemplary optical disc having a signal recording surface formed on its substrate.

FIG. 2 shows an embodiment in which a pattern of irregularities are formed on a surface of the substrate 1 bonded to the transparent film 2 so as to serve as a signal recording surface 1a.

Figure 3:
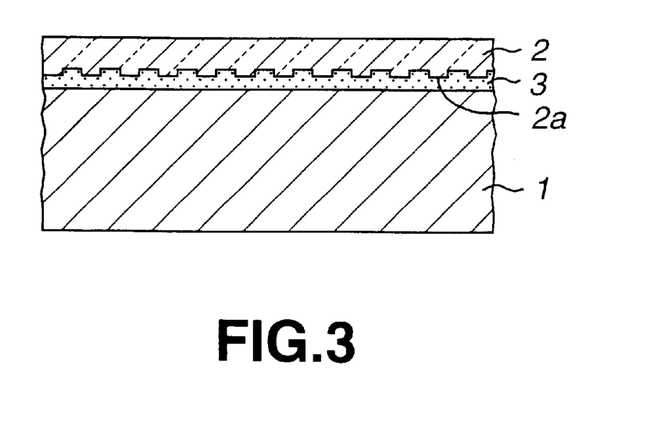
FIG. 3 is a schematic cross-sectional view showing an exemplary optical disc having a signal recording surface formed on a transparent film.

FIG. 3 shows an embodiment in which a pattern of irregularities are formed on the surface of the transparent film 2 bonded to the substrate 1 so as to serve as a signal recording surface 2a.

Figure 4:
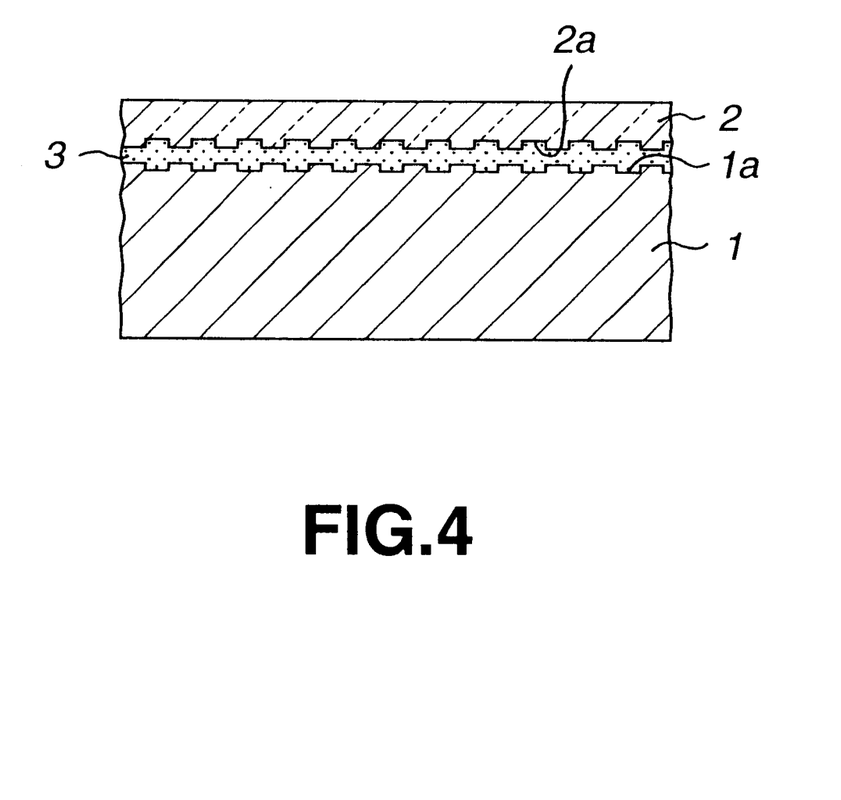
FIG. 4 is a schematic cross-sectional view showing an exemplary optical disc having a signal recording surface formed on each of the substrate and the transparent film.

FIG. 4 shows an embodiment in which signal recording surfaces 1a, 2a are formed on both the substrate 1 and the transparent film 2 to provide a dual-layer signal recording surface.

In these three cases, the substrate 1 is fabricated by injection molding a plastics material. The substrate material used need not necessarily be optically transparent, or may be other than plastics, such as glass, ceramics or metals.

In injection molding the substrate 1, accurate transcription of the irregularities presents difficulties if the substrate 1 is of an excessively reduced thickness. Therefore, if the signal recording surface is to be formed on the substrate 1, it is desirable that the thickness of the substrate 1 be not less than 0.3 mm. This allows to form a signal recording surface to high accuracy.

On the signal recording surface 1a and/or 2a, a metal reflecting surface, a semi-transparent signal layer, a signal recording layer or a variety of recording layers are formed, and information signals are reproduced by reading out the reflected light from these layers. If, in particular, signal recording surfaces are formed on both the substrate 1 and the transparent film 2, as in the embodiment shown in FIG. 4, a semi-transparent signal layer or signal recording layer is preferably formed on the signal recording surface 2a of the transparent film 2.

The recording layer is comprised of a magneto-optical recording layer, a phase-change recording layer or an organic dye layer, used alone or in combination, or may be laminated with a dielectric film for enhancement.

On the other hand, the transparent film 2 bonded to the substrate 1 needs to be optically transparent and is desirably low in birefringence. In this light, thermoplastic resins, such as, for example, polycarbonate, ARTON (JSR CO. LTD.), ZEONEX (NIPPON ZEON), polyester, or amorphous polyolefin, are desirable.

On the surface of the transparent film 2 may be formed a protective layer, such as an inorganic matter or an organic resin. The inorganic matter may be exemplified by SiN, $SiO_2$ or SiC, which may be formed to a thickness of 10 to 2000 Å to serve as a protective layer.

As characteristic of the present invention is the use of a pressure-sensitive adhesive sheet or a dry photopolymer.

Preferred examples of the pressure-sensitive adhesive sheet include a doublesided adhesive sheet of an acrylic adhesive having superior transparency and thickness, such as products manufactured by NITTO-DENKO CO. LTD. under the trade names of DA-8320 or DA-8310.

The dry photopolymer sheet is an adhesive sheet of UV light curable type having a viscosity of the order of 200 to 300 megapoise and may be a product manufactured by DU PONT S.A. under the trade name of SURPHEX.

The pressure-sensitive adhesive sheet or the dry photopolymer sheet is a sheet with a uniform thickness and may be formed easily as an adhesive layer 3 of a uniform thickness. In a manner different from the case of forming the adhesive layer by coating, the adhesive layer 3 may be easily formed to a uniform thickness, while the bonding process of the transparent film 2 can be simplified appreciably.

The transparent film 2 and the adhesive layer (pressure-sensitive adhesive sheet or the dry photopolymer sheet) 3 perform the role of the light transmitting layer. During recording or reproduction, the laser light is illuminated from the transparent film 2 or the adhesive layer 3 to the signal recording surface formed on the substrate 1 or on the transparent film 2.

It is therefore crucial to optimize the thickness of the transparent film 2 or the adhesive layer 3.

Specifically, the combined thickness of the transparent film 2 and the adhesive layer 3 is preferably 3 to 177 $\mu$m if the signal recording surface of the substrate 1 is taken into consideration. If the signal recording surface of the transparent film 2 is taken into consideration, the thickness of the transparent film 2 is preferably 3 to 177 $\mu$m.

If the function of the light transmitting layer is considered, the light transmitting layer as thin in thickness as possible is preferred for high density recording and for increasing the numerical aperture NA. However, if the light transmitting layer is too thin in thickness, it cannot perform its protective function, because the light transmitting layer also performs the role as the protective layer. If the reliability of an optical disc or the effect of collision of the objective lens onto the light transmitting layer is taken into consideration, the lower limit of the thickness is 3 $\mu$m. On the other hand, in order to accommodate not only the red laser light but also the blue laser light, in the midst of the tendency towards shorter wavelength of the laser light, an upper limit is 177 $\mu$m.

Given the above total thickness, the thickness of the transparent film 2 or that of the adhesive layer 3 is arbitrary. For example, if the adhesive layer 3 is of sufficient adhesive power, it may be of any suitable thickness.

Conversely, the adhesive layer 3 may be of any larger thickness in the above range of the total thickness. In an extreme case, the light transmitting layer may be formed solely by the adhesive layer 3.

Figure 5:
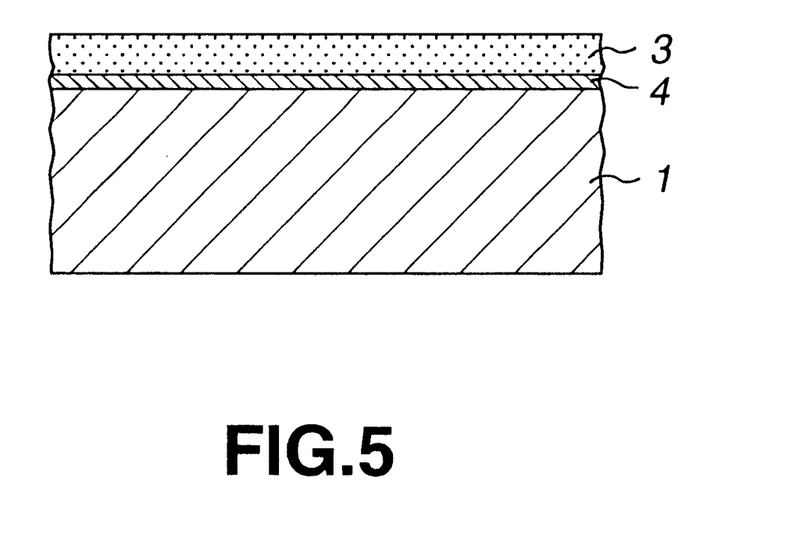
FIG. 5 is a schematic cross-sectional view showing another illustrative structure of an optical disc embodying the present invention.

FIG. 5 shows an example of an optical disc the light transmitting layer of which is formed by an adhesive layer, that is a pressure-sensitive adhesive sheet or a dry photopolymer sheet. This optical disc represents another structure of the optical disc of the present invention. This optical disc is of an extremely simplified structure in that it is comprised of adhesive layer 3 bonded to a signal recording layer (recording layer 4) formed on the substrate 1.

The above-described optical disc is targeted at a higher density recording not hitherto achieved, so that the light transmitting layer is desirably of a light transmission factor in the laser wavelength range used for recording and/or reproduction.

In light of the foregoing, in the optical disc of the structure shown in FIGS. 1 to 4, the transparent film 2 and the adhesive layer 3 are preferably a polycarbonate film and a pressure-sensitive adhesive sheet, respectively.

Figure 6:
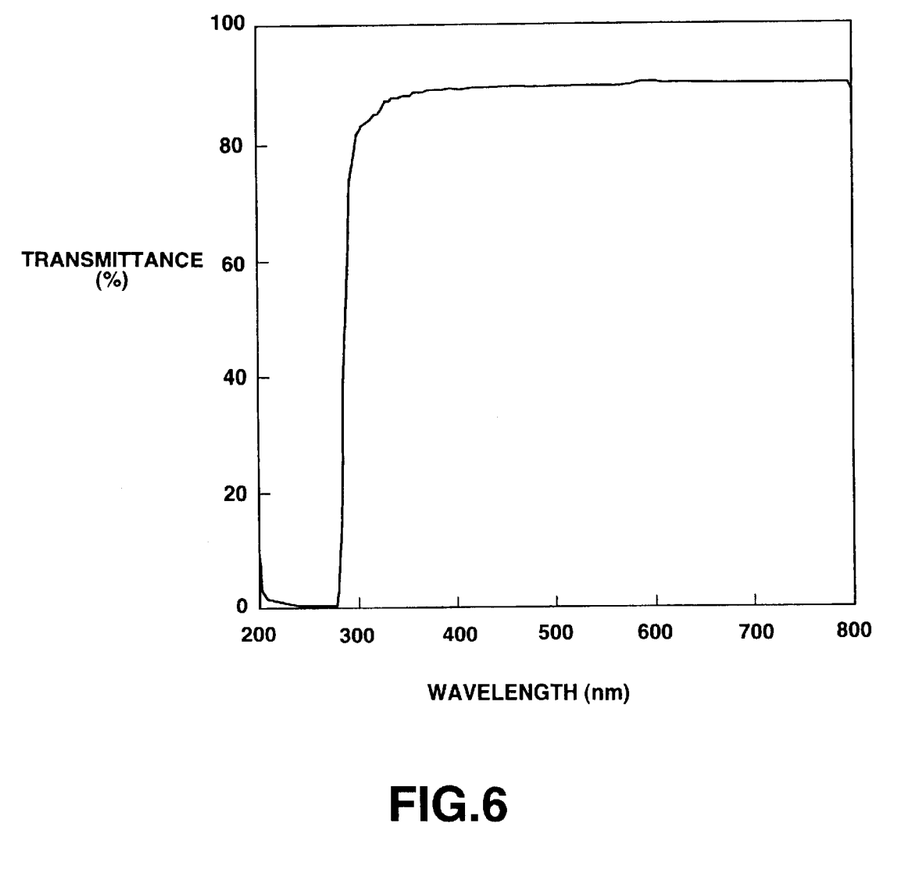
FIG. 6 is a graph showing spectroscopic optical properties of a polycarbonate film.

The polycarbonate film exhibits optimum light transmission properties in a broad wavelength range by improving purity by using ingenuous techniques in manufacture. FIG. 6 shows wavelength dependency of the light transmission factor of a polycarbonate film having a thickness of 100 $\mu$m. As may be seen from FIG. 6, the light transmission factor exceeds 80%.

Figure 7:
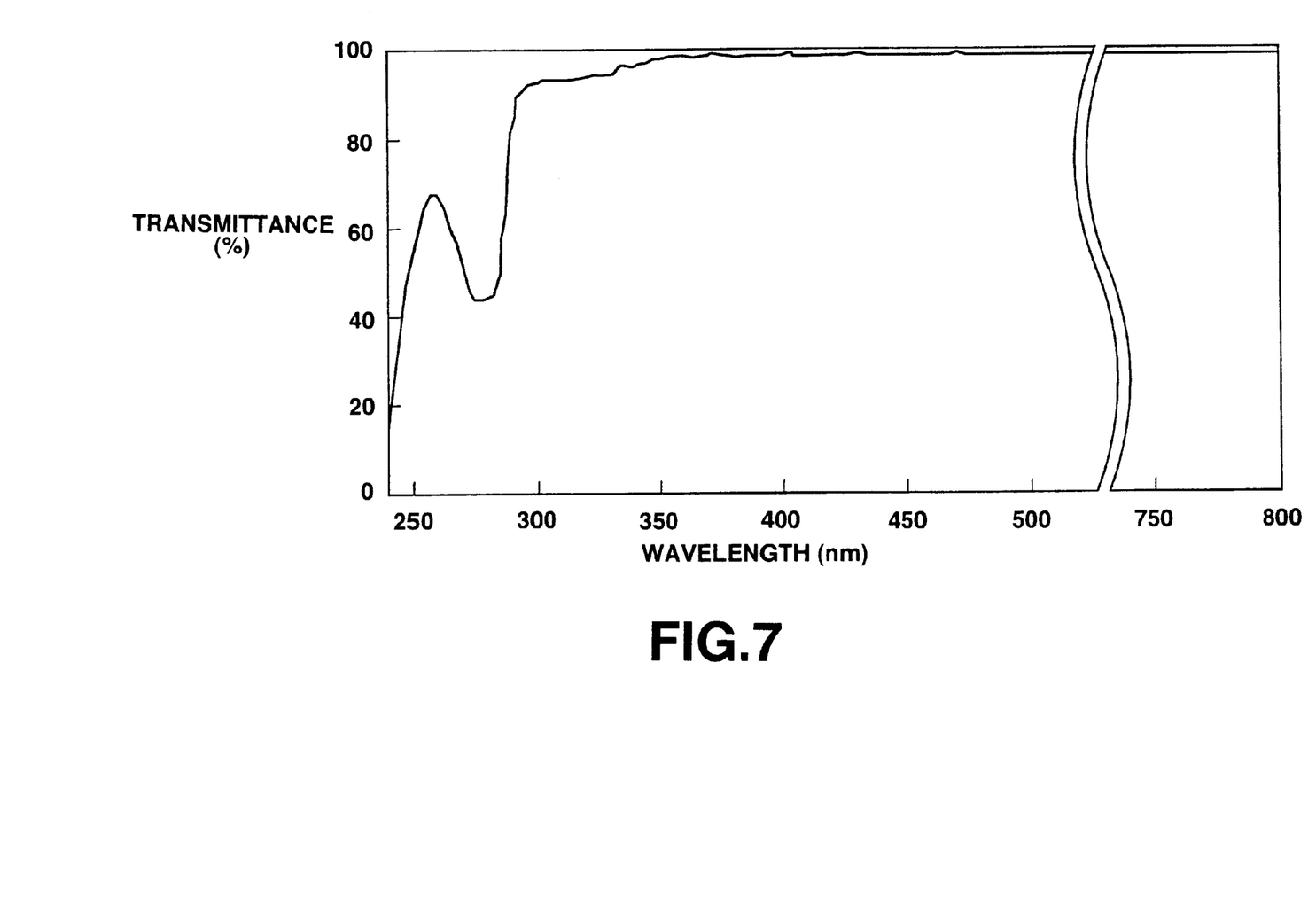
FIG. 7 is a graph showing spectroscopic optical properties of pressure-sensitive adhesive sheet.

Similarly, the pressure-sensitive adhesive sheet exhibits optimum optical properties. FIG. 7 shows measured results of the light transmission factor of sheet manufactured by NITTO DENKO CO. LTD. obtained using a spectrometer (JASCO V750). These results of measurements indicate the light transmission factor exceeding 90% in the wavelength range up to 300 mm, thus the sheet exhibiting transparency comparable to that of a glass sheet.

In reading out the information, the birefringence of the adhesive layer 3 as an intermediate layer is preferably as small as possible. If, with the larger birefringence, it is attempted to form the focal point of the read-out laser light precisely, the astigmatic aberration is increased to frustrate the attempt in forming the precise focal point. The measured results of the birefringence of the pressure-sensitive adhesive sheet indicated that the measured values were within a tolerance of measurement errors (subsequently zero).

Therefore, the pressure-sensitive adhesive sheet may be said to be unobjectionable as the adhesive layer 3 in light of its optical performance.

Thus, if the polycarbonate film and the pressure-sensitive adhesive sheet are used as the transparent film 2 and as the adhesive layer 3, respectively, it is possible to have the light transmission factor of the light transmitting layer not lower than 70% in the wavelength range of 300 nm to 800 nm and hence to realize satisfactory recording and/or reproduction comparable to that of the compact disc over the wide wavelength range. This is extremely meritorious in achieving the high density recording optical disc.

Figure 8:
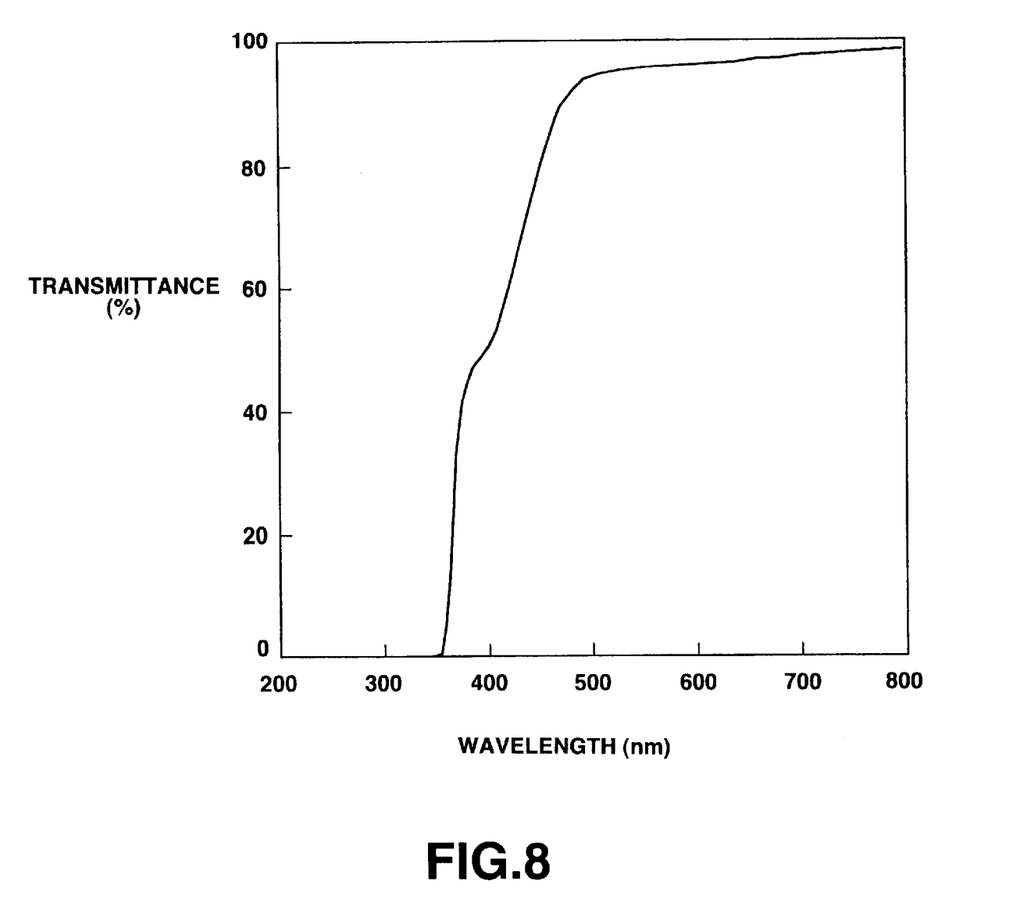
FIG. 8 is a graph showing spectroscopic optical properties of a UV light curable resin.

On the other hand, if the light transmitting layer is formed using the UV light curable resin, including the aforementioned dry photopolymer sheet, the light transmission factor is drastically lowered in the short wavelength range, as shown in FIG. 8, such that the light transmission factor is lowered to 50% or less at the wavelength of, for example, 400 nm and hence the short wavelength recording cannot be coped with satisfactorily.

A wide variety of manufacturing methods may be used for manufacturing the optical disc.

Figure 9:
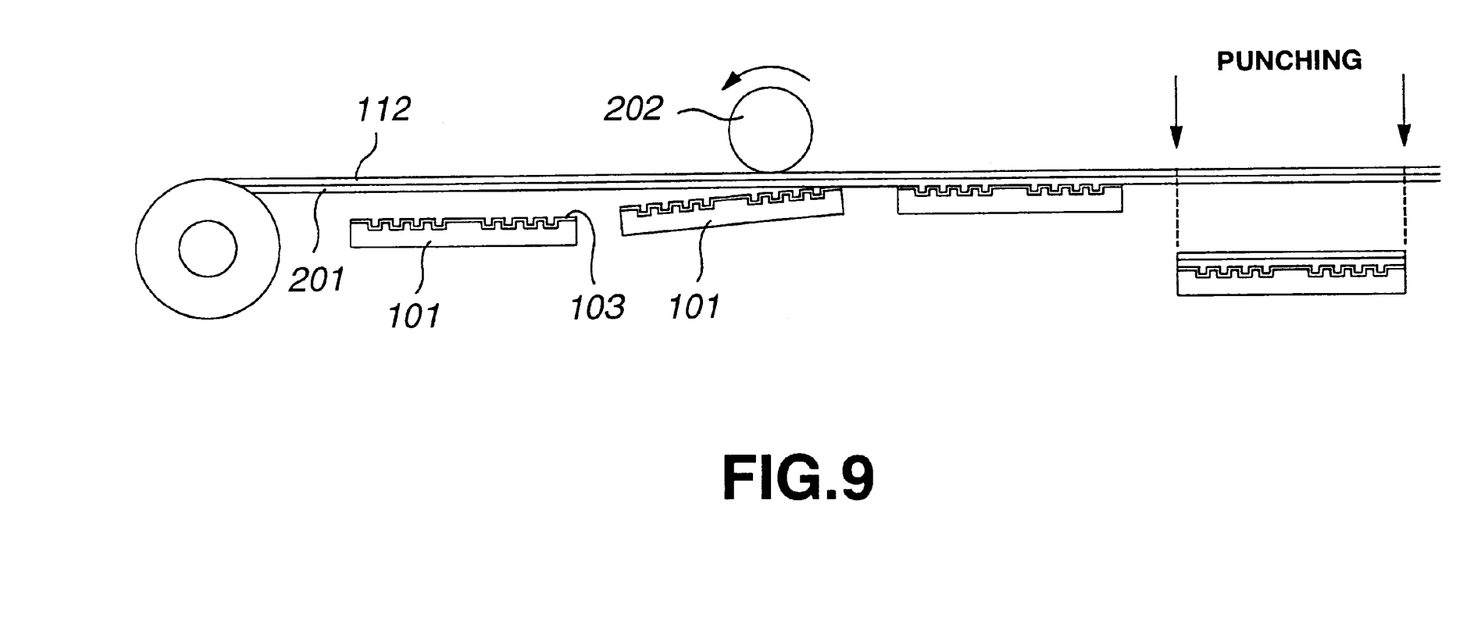
FIG. 9 is a schematic view showing an illustrative production process for an optical disc having a signal recording surface on its substrate.

For manufacturing the optical disc, having the signal recording surface 1a formed on the substrate 1, a roll of a film 112, carrying an adhesive layer 201 of a pressure-sensitive adhesive sheet or a dry photopolymer sheet, is used. The film 112 is superposed via an adhesive layer 201 on a signal recording portion 103 of the substrate 101 on which is formed a recording film or a reflective film 103a from the outset.

In this state, a film 112 is tightly pressure-bonded by a pressure bonding roll 202 on a substrate 101 so that the adhesive layer 201 will be intruded into recesses in the signal recording portion 103.

If a dry photopolymer sheet is used for the adhesive layer 201, UV light is illuminated by a UV lamp to cure the adhesive layer 201. If the adhesive layer 201 is the dry photopolymer sheet, this illumination by the UV lamp is not necessary.

It is possible to perform autoclaving by a pressure vessel or defoaming under reduced pressure after pressure-bonding the adhesive layer 201 to the signal recording portion 103 to remove air (foam) from the inside of the adhesive layer 201 or from an interstice between the film and the adhesive layer.

Finally, the film 112 and the adhesive layer 201 are punched to the shape of the substrate 101 to complete the optical disc.

Specifically, a polycarbonate film, carrying a pressure-sensitive adhesive sheet (manufactured by NITTO DENKO CO. LTD. under the trade name of DA-8310), having a thickness 50 $\mu$m, was bonded under pressure to the substrate 101, and trimmed by a punching process to complete an optical disc having a light transmitting layer with a thickness of 100 $\mu$m. The autoclaving was then carried out to reduce the amount of foaming significantly.

In the above-described manufacturing method and device, described above, both the polycarbonate film 112 and the adhesive layer 201 were used as light transmitting layers. However, if the pressure-sensitive adhesive sheet or the dry photopolymer sheet is used, solely the adhesive layer 201 can be used as a light transmitting layer.

Figure 10:
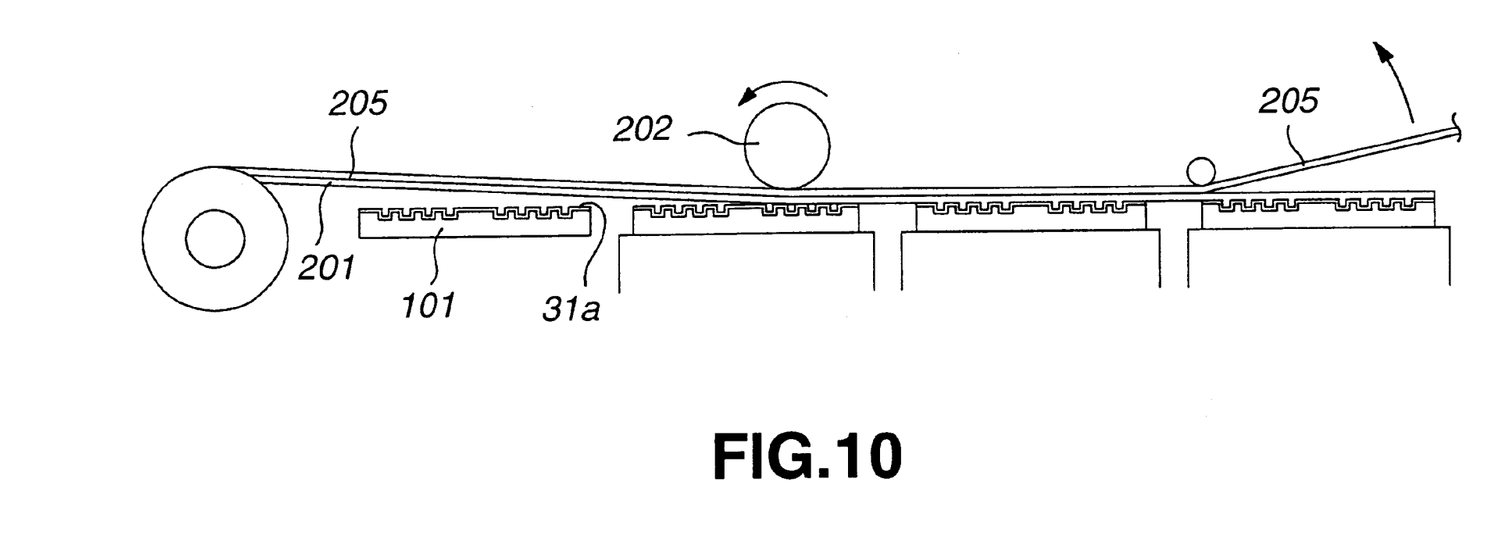
FIG. 10 is a schematic view showing another illustrative production process for an optical disc having a signal recording surface on its substrate.

FIG. 10 shows this process. Although the process shown in FIG. 10 is basically similar to a great extent to the process of FIG. 9, it differs significantly from that shown in FIG. 9 in separating a support 205 of the adhesive layer 201 after pressure bonding.

The result is that only the adhesive layer 201 is left on the substrate 101 to operate as a light transmitting layer. Therefore, there is no necessity of using a film having a superior light transmitting factor, such as polycarbonate film, as a support 205, such that mold release paper or paper of an optional material may be used.

For example, a pressure-sensitive adhesive sheet having a thickness of 50 $\mu$m (manufactured by NITTO DENKO CO. LTD. under the trade name of DA-8310) is used as the adhesive layer 201 and bonded to the substrate 101, after which the support 205 is peeled to complete an optical disc having a light transmitting layer having a thickness of 50 $\mu$m.

An optical disc having a light transmitting layer 50 $\mu$m in thickness may be obtained by employing a dry photopolymer sheet (manufactured by DUPONT S.A. under the trade name of SURPHEX) having a thickness of 50 $\mu$m as the adhesive layer 201 and by bonding it to the substrate 101, the substrate 205 then being detached to complete an optical disc having a light transmitting layer with a thickness of 50 $\mu$m.

In either cases, the above-described processes are repeated to give a light transmitting layer having a thickness equal to a multiple of that of the adhesive layer 201.

If, in producing an optical disc having the signal recording surface 2a formed on the transparent film 2 as shown in FIG. 3, the signal recording surface 2a is to be produced on the transparent film 2, the 2P (photo-polymerization) method or the direct embossing method may be used.

Figure 11:
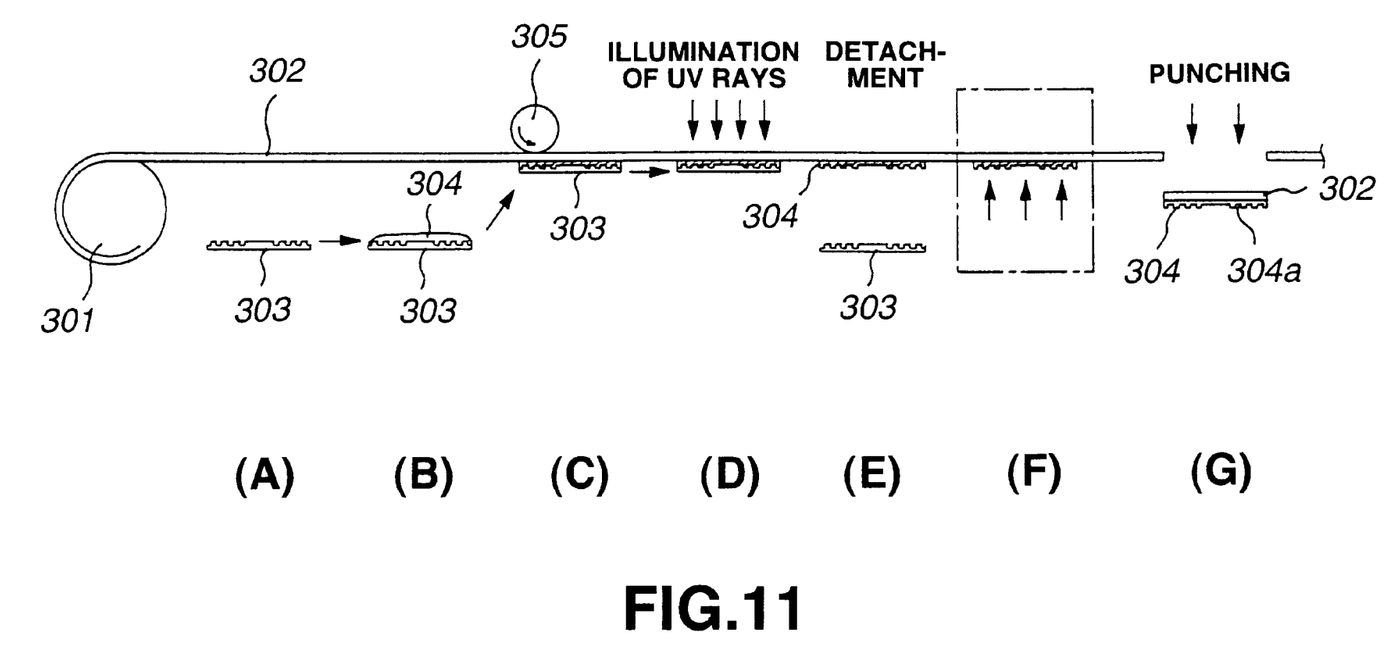
FIG. 11 is a schematic view showing an illustrative process for forming a signal recording surface on a transparent film by the 2P method.

FIG. 11 shows an illustrative process for forming a signal recording surface on a transparent film by the 2P method.

In the present embodiment, a signal recording surface is continuously formed on a transparent film 302 paid out from a roll 301.

That is, in the present method, a stamper 303 having a reversed pattern of crests and recesses of the signal recording surface is provided as shown at step A and a UV light curable resin 304 is coated thereon at step B.

Then, at step C, a transparent film 302 is pressure-bonded to the stamper 303 coated with the UV light curable resin. This pressure bonding transcribes the pattern of the crests and recesses of the stamper 303. Here, roller pressure bonding by a roll 305 is used. In this state, the UV light is illuminated from the transparent film 302 at step D to cure the UV light curable resin 304. The stamper 303 is peeled from the UV light curable resin 304 at step E.

Finally, a semi-transparent signal layer or a signal recording layer, formed of, for example, SiN, is formed by a film-forming technique, such as sputtering, at step F, and punched to a disc shape, at step G, to give the transparent film 302 comprised of a signal recording surface 304a formed on the UV light curable resin 302.

Figure 12:
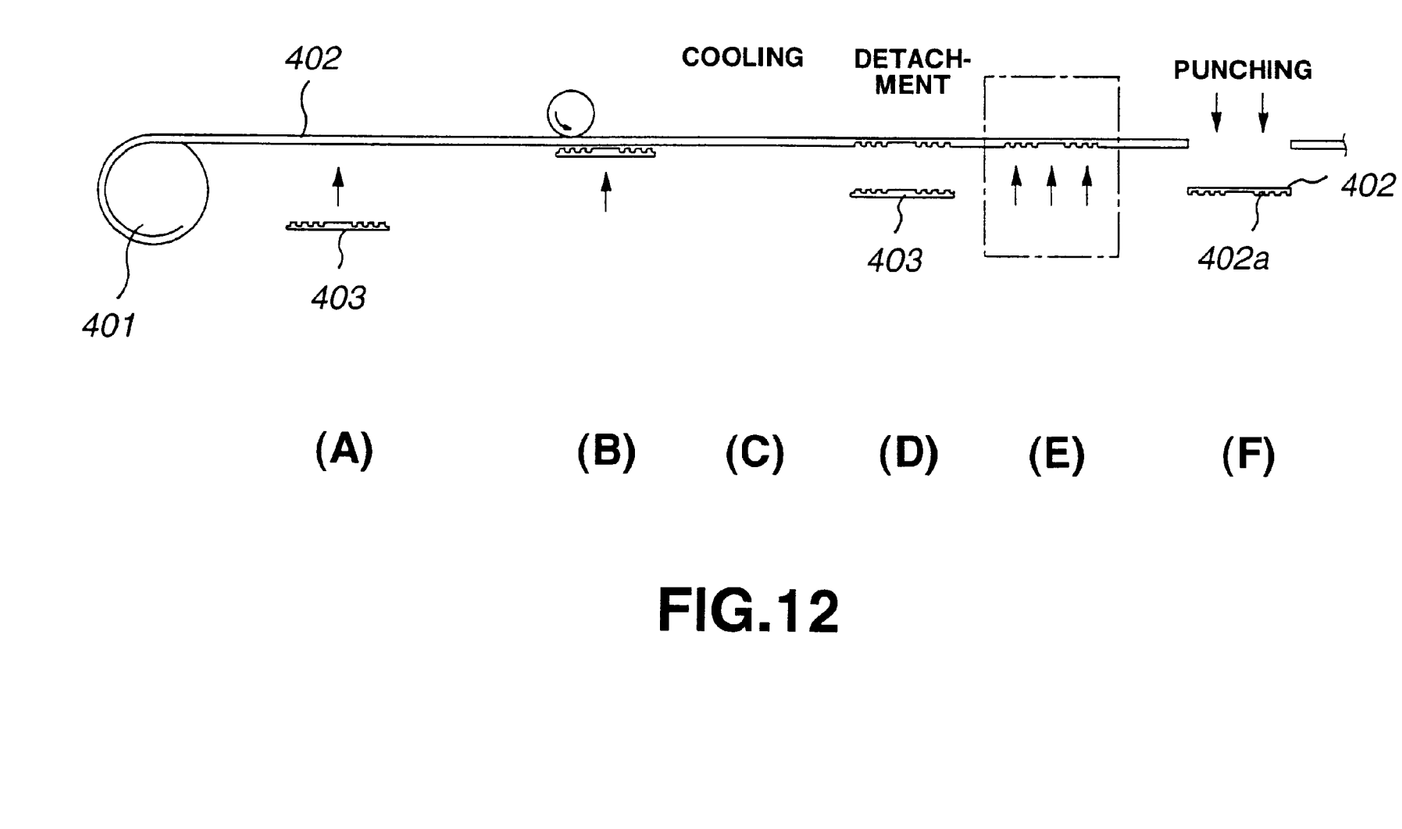
FIG. 12 is a schematic view showing an illustrative process for forming a signal recording surface on a transparent film by an embossing method.

FIG. 12 shows an exemplary process for forming a signal recording surface on the transparent film by the embossing method. In the case of the embossing method, a pattern of crests and recesses are directly transcribed on the transparent film by a stamper.

A signal recording surface is continuously formed on a transparent film 402 reeled from a roll 401, as in the aforementioned 2P method.

A stamper 403, carrying reversed pattern of crests and recesses, as shown at step A, is provided and pressure-bonded by a roll 404 to the transparent film 402 at step B.

The transparent film 402 is preferably heated to a suitable temperature for transcribing the pattern of crests and recesses of the stamper 403.

After cooling (step C), the stamper 403 is peeled from the transparent film 402 (step D) and a semi-transparent signal layer or a signal recording layer, formed of, for example, SiN, is formed by a film-forming technique, such as sputtering (step E).

The film then is punched (step F) to a disc shape to give the transparent film 402 comprised of a signal recording surface 402a.

The method for continuously forming an optical disc having two signal recording surfaces as shown in FIG. 4 by application of the aforementioned embossing method is explained.

Figure 13:
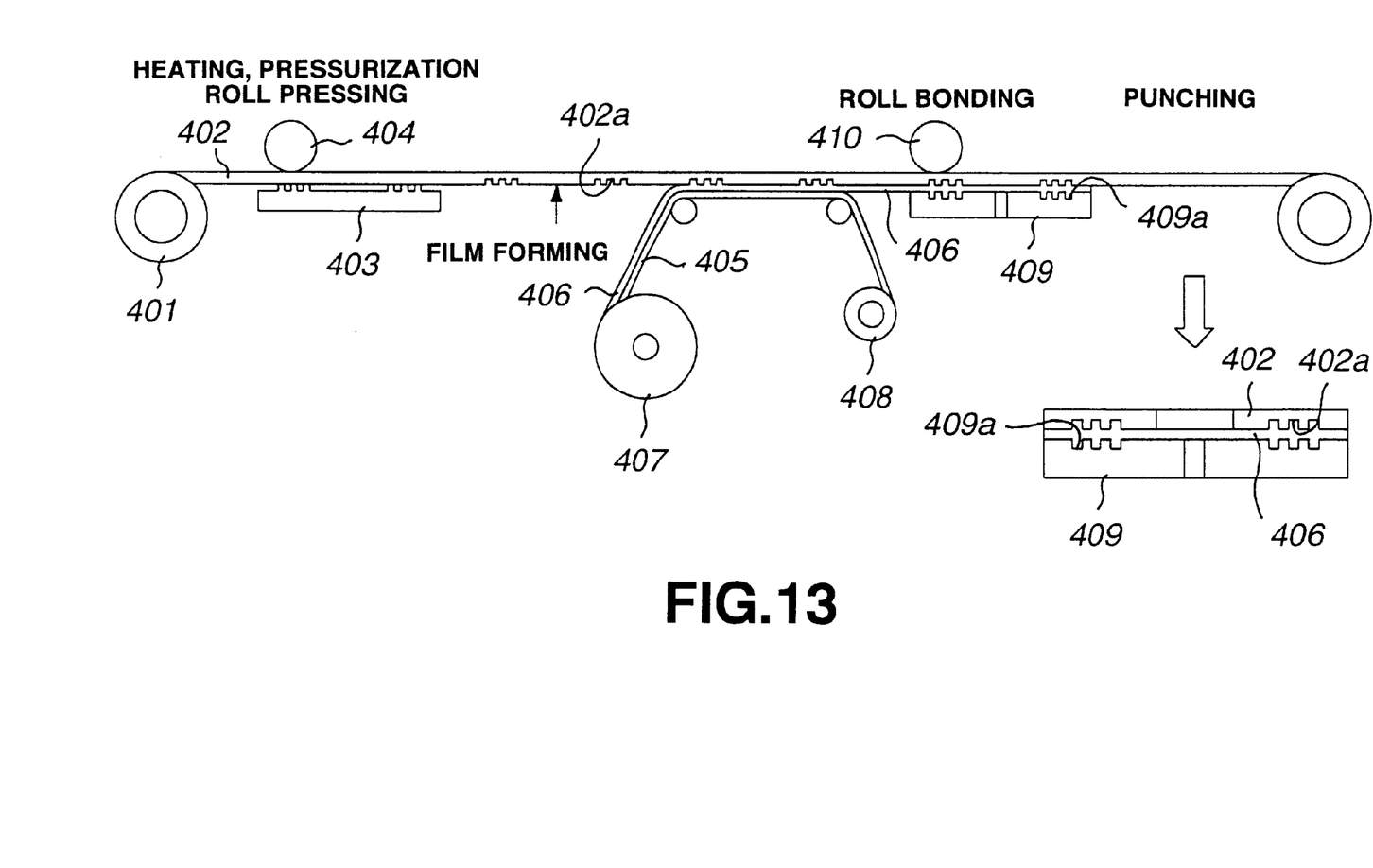
FIG. 13 is a schematic view showing an illustrative process for fabricating an optical disc having two signal recording surfaces.

FIG. 13 shows an exemplary continuous forming process, which is similar to the above-described embossing method in continuously forming the signal recording surface 402a by transcribing and film-forming the pattern of the crests and recesses by the stamper 403.

An adhesive layer 406 (pressure-sensitive adhesive sheet or the dry photopolymer sheet) formed on the mold release sheet 405 is reeled from the roll 407 and bonded on the signal recording surface 402a of the transparent film 402.

The mold release paper 405 is separated from the adhesive film 406, as it is taken up on a take-up roll 408, and a substrate 409, carrying the signal recording surface 409a, is bonded to the exposed adhesive layer 406, using a roll 410.

The resulting assembly is punched to a disc to complete an optical disc having two signal recording layers.

Figure 14:
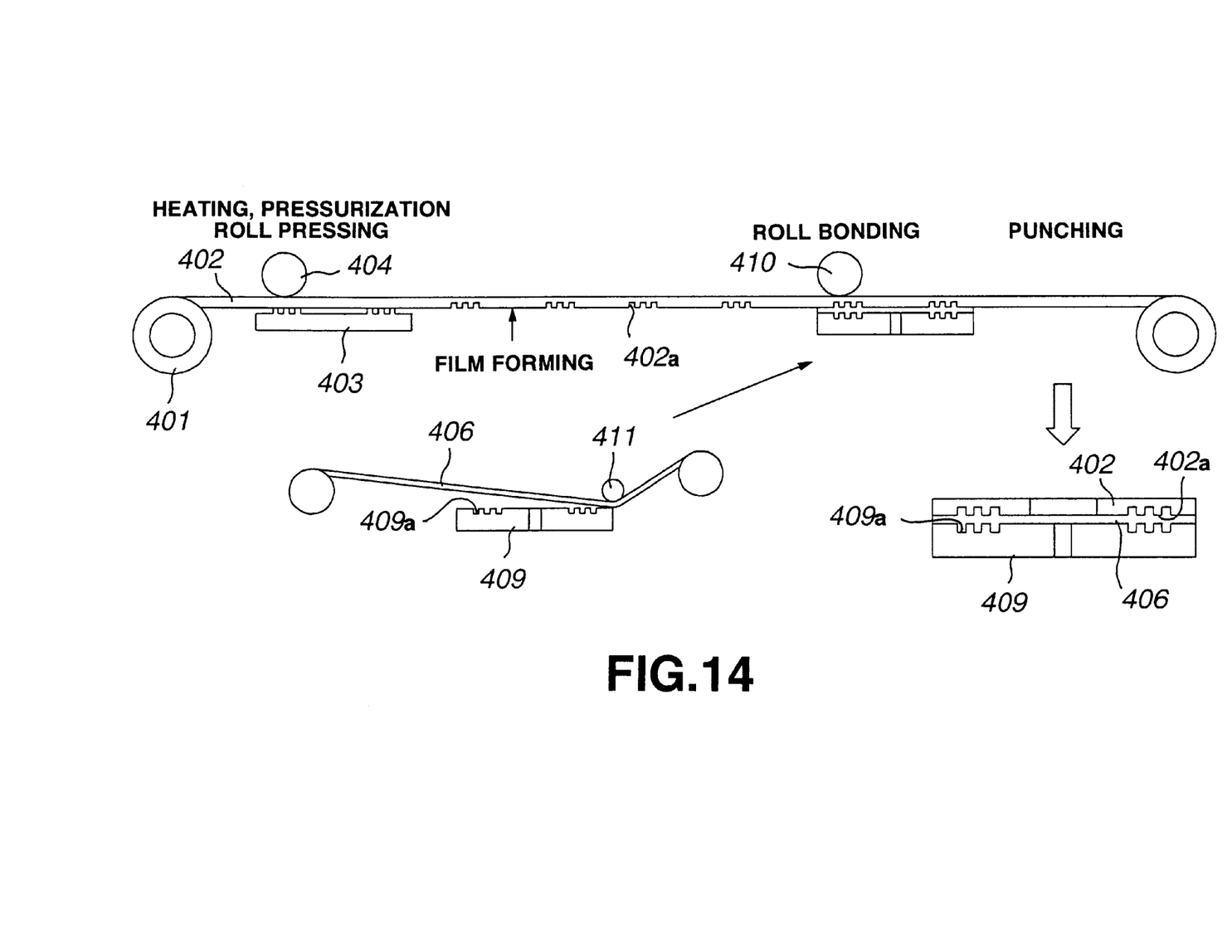
FIG. 14 is a schematic view showing another illustrative process for fabricating an optical disc having two signal recording surfaces.

By way of modification, it is possible to bond an adhesive film 406 on the signal recording surface 409a of the substrate 409 by a pressure bonding roll 411 in advance and to bond the resulting assembly on the signal recording surface 402a formed on the transparent film 402.

The foregoing description has been made on the method for forming a light transmitting layer employing the pressure-sensitive adhesive sheet or the dry photopolymer sheet and a method for forming an optical disc having this light transmitting layer. However, a variety of modification are possible insofar as the manufacturing process is concerned.

What is claimed is:
1. An optical disc in which a transparent film is bonded via a pressure-sensitive adhesive sheet or a dry photopolymer sheet on a substrate and in which a signal recording surface is formed on said substrate and/or the transparent film; wherein recording and/or reproduction for said signal recording surface is effected from a light transmitting layer comprised of the pressure-sensitive adhesive sheet or the dry photopolymer sheet and the transparent film.

2. The optical disc according to claim 1 wherein the film thickness of said light transmitting layer is not more than 500 µm.

3. The optical disc according to claim 1 wherein the film thickness of said light transmitting layer is 3 to 177 µm.

4. The optical disc according to claim 1 wherein said transparent film is a thermoplastic resin, such as a polycarbonate resin film, and wherein said polycarbonate resin film is bonded via a pressure-sensitive adhesive sheet, said light transmitting layer having a light transmission factor exceeding 70% in a wavelength range of 300 to 800 µm.

5. The optical disc according to claim 4 wherein said thermoplastic resin is a polycarbonate film.

6. The optical disc according to claim 1 wherein said substrate is produced by injection molding.

7. The optical disc according to claim 1 wherein said substrate has a thickness not less than 0.3 mm.

8. The optical disc according to claim 1 wherein a protective layer is formed on the surface of said transparent film.

9. The optical disc according to claim 1 wherein said signal recording surface is formed on a bonding surface of said substrate.

10. The optical disc according to claim 1 wherein said signal recording surface is formed on a bonding surface of said transparent film.

11. The optical disc according to claim 1 wherein said signal recording surface is formed on bonding surfaces of said substrate and said transparent film.

12. An optical disc in which at least one major surface of a substrate is a signal recording surface and in which a pressure-sensitive adhesive sheet or a dry photopolymer sheet is bonded as a light transmitting layer on said signal recording surface; wherein recording and/or reproduction is performed from said light transmitting layer with respect to said signal recording surface.

13. The optical disc according to claim 12 wherein said light transmitting layer has a film thickness not larger than 500 μm.

14. The optical disc according to claim 12 wherein said film thickness of said light transmitting layer is 3 to 177 μm.

15. The optical disc according to claim 12 wherein said light transmitting layer is a pressure-sensitive adhesive sheet and wherein the light transmission factor of said light transmitting layer is not less than 70% in the wavelength range from 300 nm to 800 nm.

16. The optical disc according to claim 12 wherein said substrate is produced by injection molding.

17. The optical disc according to claim 12 wherein said substrate has a thickness not less than 0.3 mm.

* * * * *